UNITED STATES PATENT OFFICE.

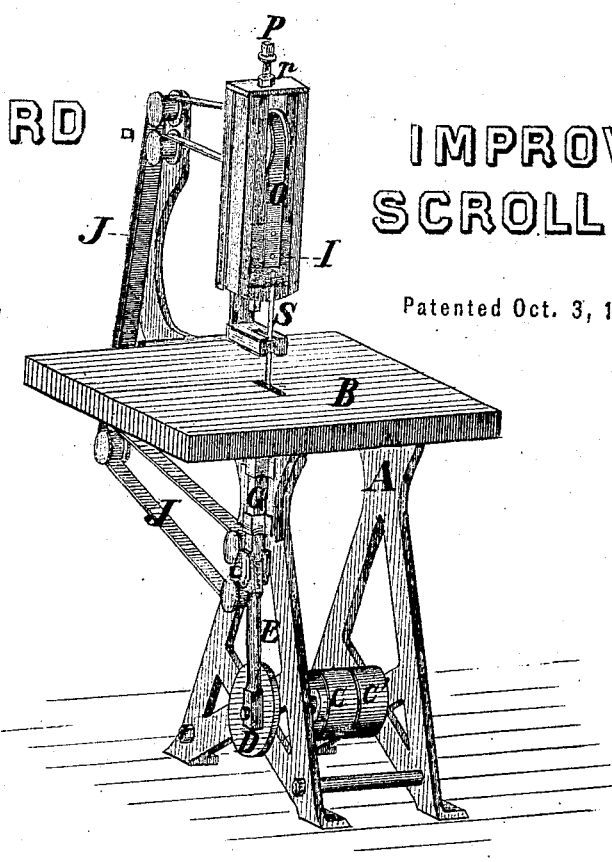
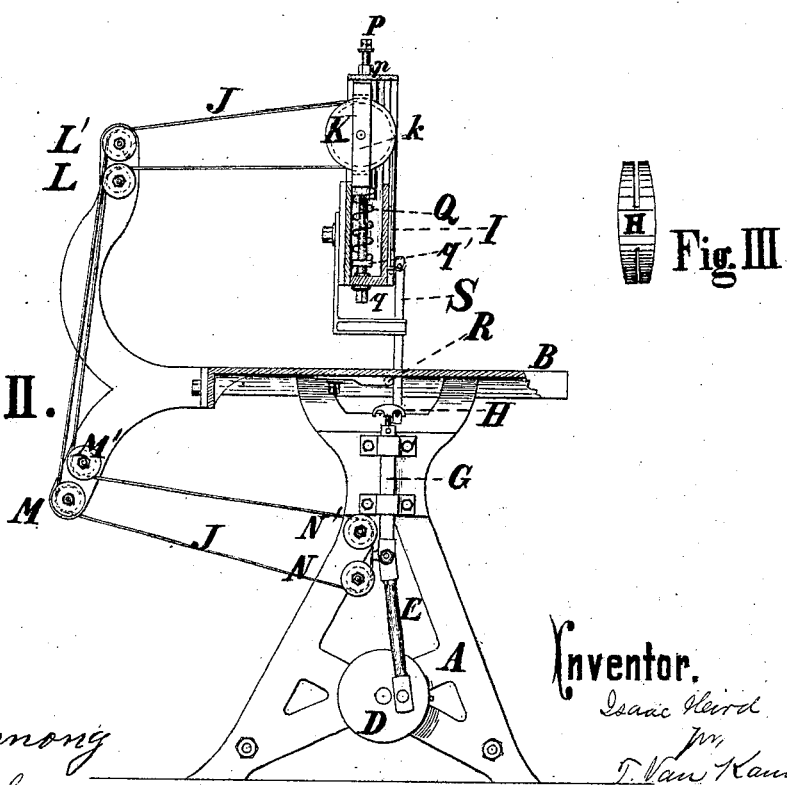

ISAAC HIRD, OF CINCINNATI, OHIO.

IMPROVEMENT IN SCROLL-SAWS.

Specification forming part of Letters Patent No. 119,517, dated October 3, 1871.

*To all whom it may concern:*

Be it known that I, ISAAC HIRD, of Cincinnati, in the county of Hamilton and State of Ohio, have invented a new and Improved Scroll-Saw; and I do hereby declare that the following is a full, clear, and exact description of the same, reference being had to the annexed drawing making a part of this specification.

Figure 1 is a perspective, and Fig. 2 is a side elevation of the same. Fig. 3 is a plan of saw-head.

Similar letters indicate like parts.

The nature of my invention relates to a scroll-saw wherein motion is imparted to the saw by means of a belt or cord stretched over a series of friction-rollers and attached to both ends of the saw. My improvement consists of an endless belt passing over a series of friction-rollers, as above mentioned, in such a manner that sufficient room may be left between the saw and the belt to allow turning the work while sawing, the saw being attached to straps or branches projecting from the endless belt, as will be more fully hereinafter described. My invention also consists of a device by which the tension on the saw may be varied to any desired degree and at the same time preventing any overstrain on the saw while in motion, thus bringing into use finer saws, run at higher speed, which gives greater range for work and effects a saving of time. It further consists in providing the slide into which the lower end of the saw is hung with a revolving head, having cuts of varying widths to admit saws of varying thicknesses.

In the drawing, A A is the frame; B, the table; C and C', tight and loose pulleys; and D, crank-wheel, to which pitman E is attached, carrying slide G and revolving head H. The saw is attached with one end at head H. The other is attached to slide I. The means employed to give motion to the saw without overstraining the same consists of the endless belt J passing over the friction-pulleys K, L L', M M', and N N', and the branch of the belt seen at O, attached to slide I. The attachment of the slide G to the belt J is made between the rollers N and N', in order that the motions of that part of the belt and the slide may be parallel. The roller K is pivoted in a sliding carriage, $k$, working freely in a vertical direction in suitable guides. A set-screw, P, and lock-nut $p$, prevents the roller K from rising higher than the length of the saw will permit. At Q is seen a coil-spring, acting on the under part of the carriage $k$, pressing it upward, the amount of pressure being regulated by screw $q$ and nut $q'$. The friction-roller R presses against the saw S below the table B and makes it more rigid.

The operation of my invention is as follows: In putting in a saw, the cut in the head H is brought into proper position that fits best the saw to be used, and having placed the pin passing through it in the notch, the upper slide I is drawn so as to slip the upper pin over the fork. The set-screw P is then adjusted so as to take up the full length of the saw, when the lock-nut $p$ is brought down to fasten the screw in place. The screw $q$ may now be turned so as to elevate or depress the nut $q'$, thus compressing the spring Q more or less, which force is communicated to the carriage $k$, thus placing any degree of tension on the saw desired.

It will be observed that the motion of the slide G, the belt J, and its branch O are simultaneous and equal in extent, and the downward stroke of the saw needs not to overcome the stretch and inertia of the entire belt or cord, but simply the small branch O and slide I. It will also be observed that the friction-rollers L L' are placed nearly at a right angle with roller K, so that the force applied by the belt may not affect the state of the carriage $k$. The purpose of the spring Q is to keep the saw stretched uniformly in all parts of the stroke.

What I claim as new, and desire to secure by Letters Patent, is—

1. An endless belt, J, working over suitable guide-pulleys to carry it out of the way of the work upon the table, combined with the saw S and branch O and slide G, substantially as and for the purpose set forth.

2. In combination with the pulley, carriage $k$, the uniform-tension spring Q, set-screw P, and tension-screw $q$, substantially as set forth.

3. The revolving head H, having notches of varying widths to admit saws of varying thicknesses, substantially as and for the purpose herein specified.

ISAAC HIRD.

Witnesses:
  T. VAN KANNEL,
  R. H. PERRINE.